F. H. MERCER & H. F. H. BLEASE.
MACHINE FOR THE MANUFACTURE OF TIRE COVERS.
APPLICATION FILED JUNE 20, 1917.
1,299,497.
Patented Apr. 8, 1919.
4 SHEETS—SHEET 1.
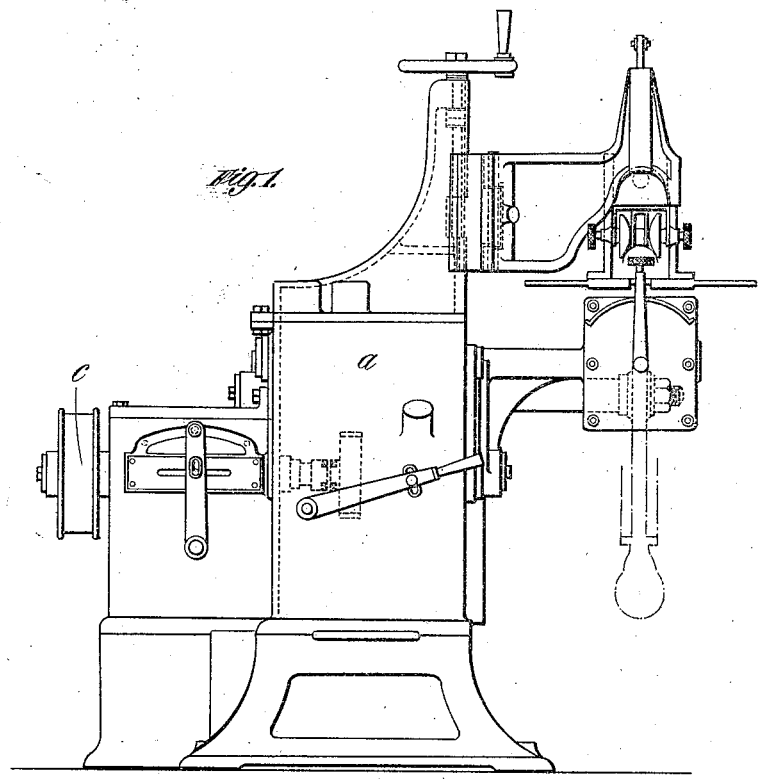
INVENTORS:
Frank Holt Mercer and
Herbert Frederick Hassall Blease
By Att'ys
Fraser, Dunk & Myers

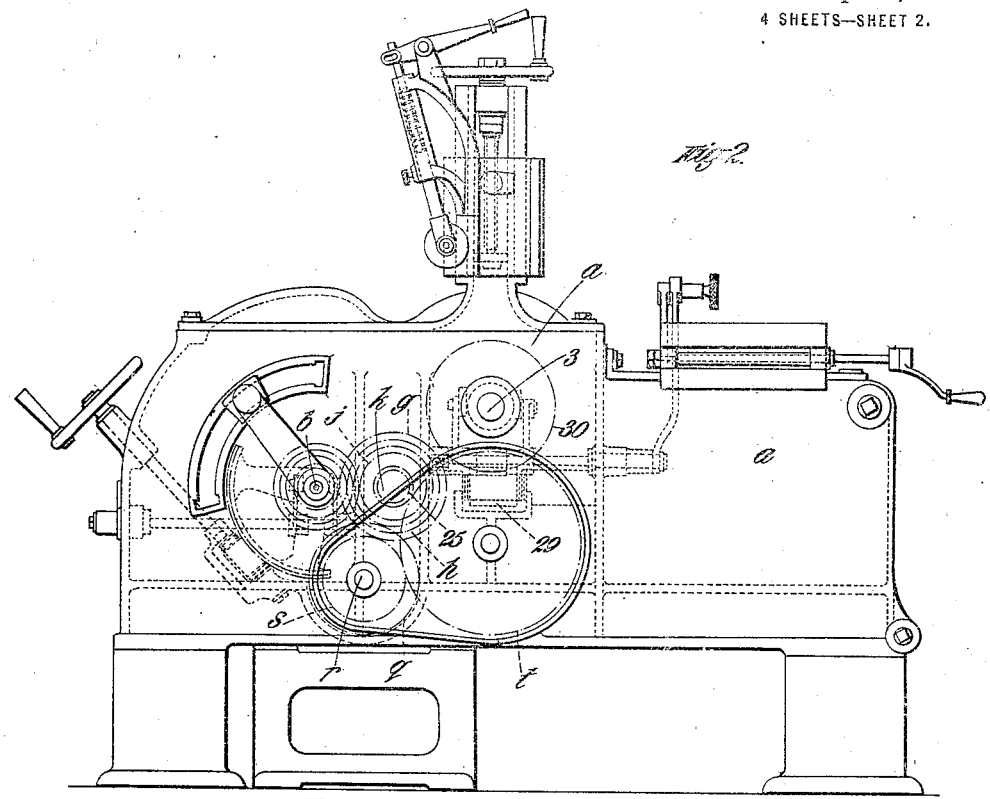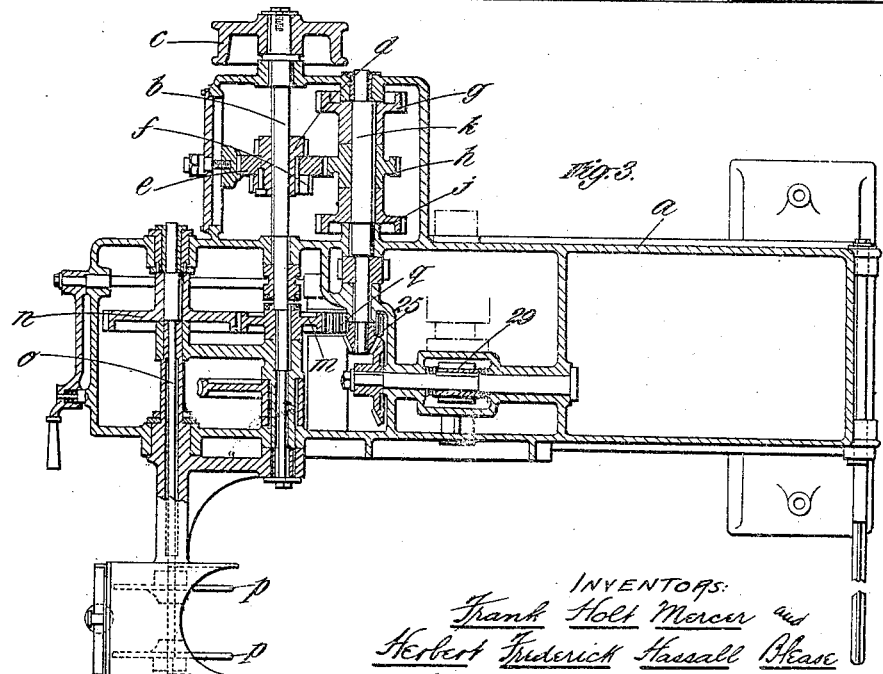

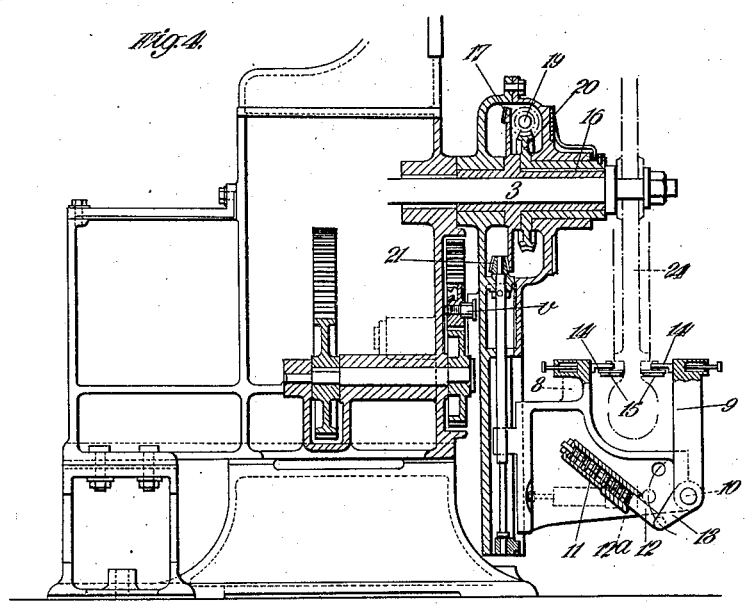

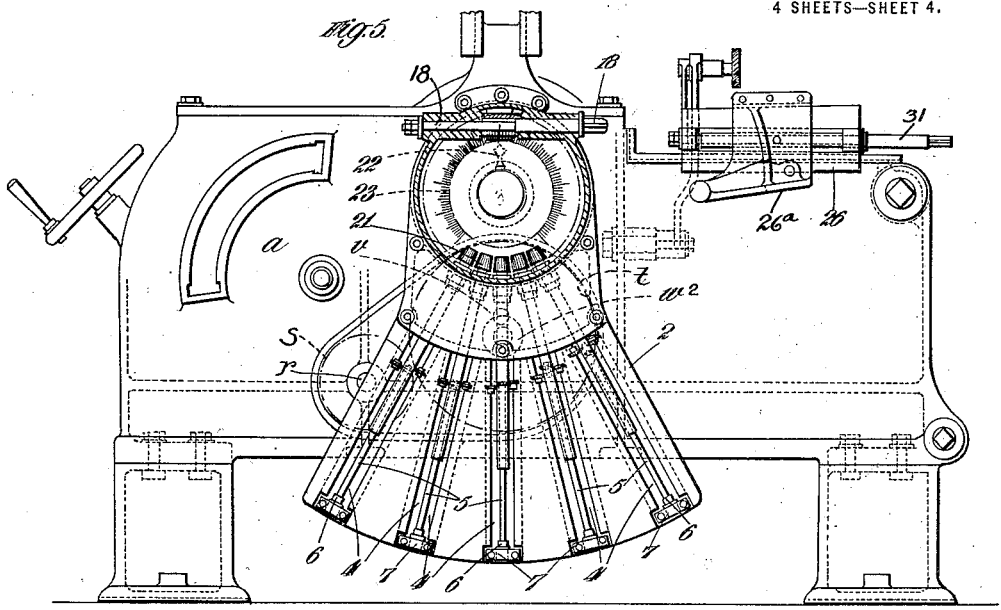
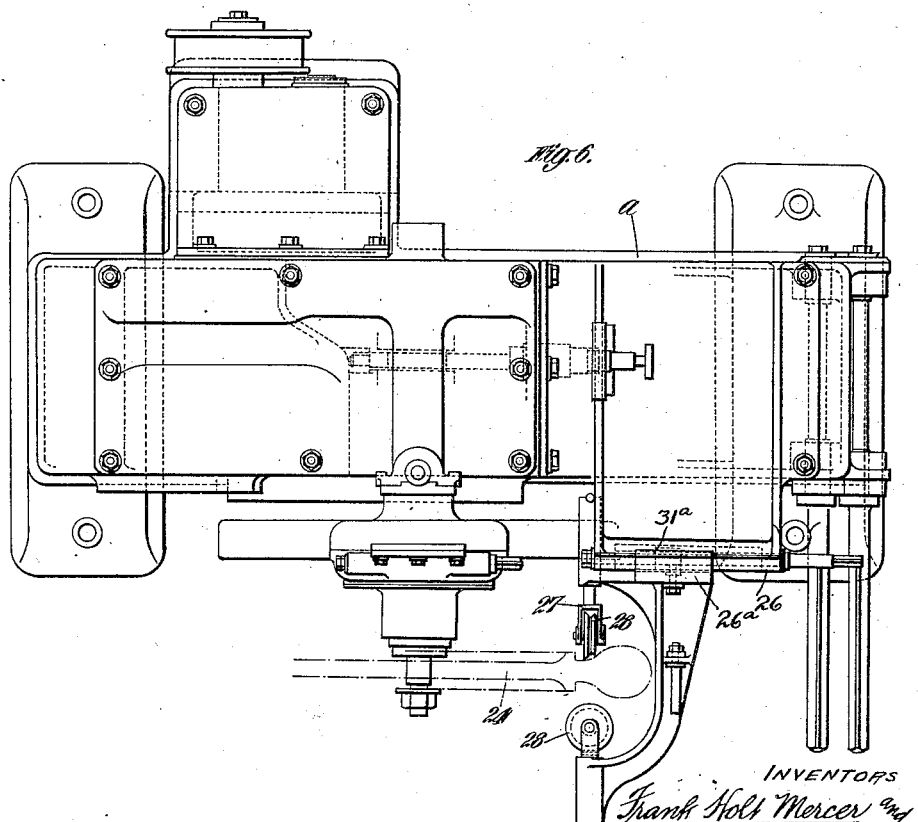

UNITED STATES PATENT OFFICE.

FRANK HOLT MERCER AND HERBERT FREDERICK HASSALL BLEASE, OF MELKSHAM, ENGLAND.

MACHINE FOR THE MANUFACTURE OF TIRE-COVERS.

1,299,497.   Specification of Letters Patent.   Patented Apr. 8, 1919.

Application filed June 20, 1917. Serial No. 175,860.

*To all whom it may concern:*

Be it known that we, FRANK HOLT MERCER, mechanical engineer, and HERBERT FREDERICK HASSALL BLEASE, mechanical engineer, both subjects of the King of Great Britain and Ireland, and residents of Melksham, Wilts, England, have invented certain new and useful Improvements in or Relating to Machines for the Manufacture of Tire-Covers, of which the following is a specification.

This invention relates to the manufacture of tire covers, composed of fabric coated with rubber, having a regular or irregular portion which fits the wheel rim. The object of this invention is to provide a machine for shaping that regular or irregular portion which fits the wheel rim.

A machine made in accordance with this invention comprises a rocking member adapted to be rocked about the center on which the core is mounted, carriers on said rocking member, arms on said carriers disposed on each side of the core, means for moving the carriers simultaneously toward or away from the center of the core, spring-pressed plungers on said arms containing rollers, and adapted to bear on the core or fabric, at or near that portion which fits the wheel rim, means for moving the arms on one or both sides of the core away from the core and means for oscillating the rocking member.

Means are provided for positioning the beads or the cores for any regular or irregular portion which fits the wheel rim in correct position on the fabric, prior to their being covered with the outer layer or layers of fabric forming the cover.

Referring to the accompanying drawings:—

Figure 1 is a side elevation of one form of machine made in accordance with this invention;

Fig. 2 is a front elevation;
Fig. 3 is a sectional plan;
Fig. 4 is a sectional side elevation;
Fig. 5 is a front elevation; and
Fig. 6 is a plan.

On the frame $a$ of the machine is mounted a main shaft $b$ adapted to be driven by the pulley $c$. On the shaft $b$ are mounted toothed speed gear wheels $d$ $e$ $f$ adapted to mesh with gear wheels $g$ $h$ $j$ on the countershaft $k$. On the shaft $b$ is a pinion $m$ adapted to drive the toothed wheel $n$ keyed to the shaft $o$. On the shaft $o$ are disposed disks $p$ $p$ which form the subject matter of a concurrent patent application. The pinion $m$ drives also the spur wheel $q$ on the shaft $r$. On the shaft $r$ is a wheel $s$ (not shown in plan) which drives the spur wheel $t$.

The rocking member 2 is mounted on a sleeve 16 on a shaft 3 on the frame $a$ of the machine. On the spur wheel $t$ is a stud $v$ (see Figs. 4 and 5) which engages with a radial slot $w$ in the boss $w'$ on the rocking member 2. On rotating the wheel $t$ the stud $v$ travels in a circular path $w^2$ shown in dotted lines in Fig. 5, thus causing a rocking motion of the member $r$. The rocking member is provided with radially disposed guides 4. A screwed shaft 5, passes down the center of each guide, and each shaft is adapted to engage with a threaded lug or nut 6 on a carrier 7. Each carrier is provided with a fixed arm 8 and an arm 9 pivoted at 10. The pivoted arm 9 is held in position by a spring 11 through a plunger 12 and lever 13 on the arm 9. The plunger 12 is mounted in a cylinder which is pivoted to the frame of the carrier at $12^a$. On each pair of the arms 8, 8, 8 and 9, 9, 9 are mounted spring-pressed plungers 14, 14, carrying rollers 15, 15, which are adapted to bear on that portion of the work which forms the bead of the tire being formed by the machine. These rollers are preferably placed in steps so as to press the material into the desired form working gradually around the tire as the core rotates, the rollers tending to cause the fabric to draw from the crown toward and over the bead.

The carriers 7, 7 are adapted to be moved collectively in the following manner: On the shaft 3 is disposed a sleeve 16 which carries a beveled wheel 17 which is adapted to be rotated through a worm 19 and worm wheel 20 by a handle adapted to fit the squared end of the shaft 18. On each shaft 5 is a beveled pinion 21 which engages with the beveled wheel 17. The position of the carriers is indicated by means of a pointer 22 which passes over a scale 23 as they are moved to or from the center of the shaft 3. On the shaft 3 is disposed the core 24 on which the tire is to be molded. On the shaft $k$ is a beveled pinion 25 (Fig. 3) adapted to drive the shaft 3 on which the core is mounted through worm 29 and worm wheel 30. A clutch is provided on shaft $b$ for throwing gear wheel $m$ in and out of action.

The means for fixing the bead or the core for any regular or irregular portion which fits the wheel rim in correct position on the fabric prior to their being covered with another layer or layers of fabric comprise a carriage 26ª on a slide 26 mounted on the frame of the machine and carrying spring-pressed plungers 27 disposed on each side of the core and carrying rollers 28 at right angles to the plane of the core or otherwise suitably. The said rollers which are referred to hereafter as positioning rollers are mounted in said plungers 27. The carriage 26ª on the slide 26 can be moved toward or away from the center of the core by means of a screwed shaft 31 engaging a screwed lug or nut 31ª fixed on the carriage 26ª.

In operation the layers of fabric forming the foundation of the tire are placed on the core and shaped. After the necessary plies of canvas have been put on, the beads or cores of any regular or irregular portion which are adapted to fit the wheel rim are placed on the canvas and their position accurately adjusted by means of the positioning rollers. After the beads or above mentioned cores are in position, the said positioning rollers are withdrawn and the remaining plies of canvas are placed in position so as to cover the beads or above mentioned cores. The rocking member is then placed in position so that the rollers press against the fabric and set in motion to mold the canvas on to the beads to the desired form as the core on which the fabric is disposed is rotated so as to bring different parts of the tire successively under the action of the rollers.

With a machine made in accordance with this invention the whole of the surface of the bead or that part of the regular or irregular portion which fits the wheel rim is pressed by the rollers disposed one in advance of the other whereby the bead is effectively shaped, thus obviating any air holes or puckers in the material.

What we claim and desire to secure by Letters Patent is:—

A machine for shaping on a core disposed on a shaft, tire covers, composed of fabric coated with rubber provided with beads or projections adapted to fit the rim of a wheel, said machine comprising a rocking member, carriers on said rocking member, rollers mounted on said carrier, means for pressing said rollers against the fabric, means for oscillating said rocking member about the center of the shaft on which the core is mounted, and means for moving said carriers individually and collectively toward and away from the center of said core.

In witness whereof, we have hereunto signed our names in the presence of two subscribing witnesses.

FRANK HOLT MERCER.
HERBERT FREDERICK HASSALL BLEASE.

Witnesses:
FREDERICK ERNEST LAURIE NEWTON,
GEORGE BELOE ELLIS.